O. G. SHAW & G. A. McKENZIE.
MOLD.
APPLICATION FILED JAN. 11, 1916.
1,211,632.
Patented Jan. 9, 1917.
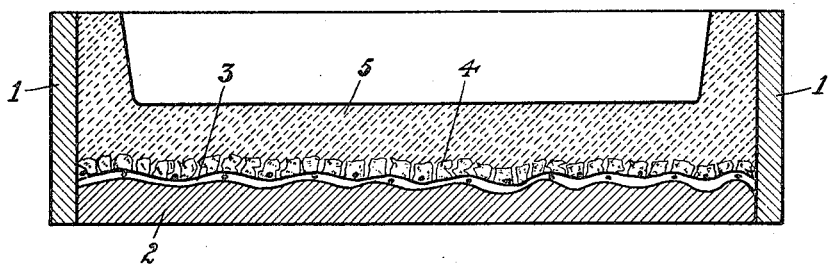
Fig. 1
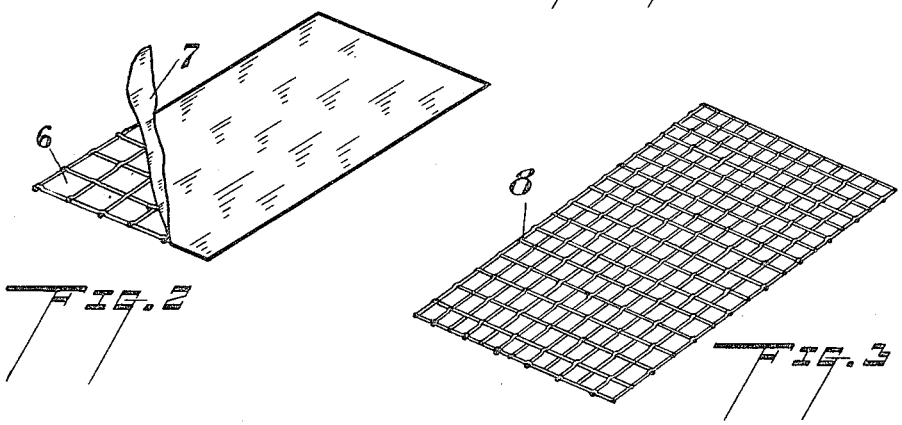
Fig. 2
Fig. 3
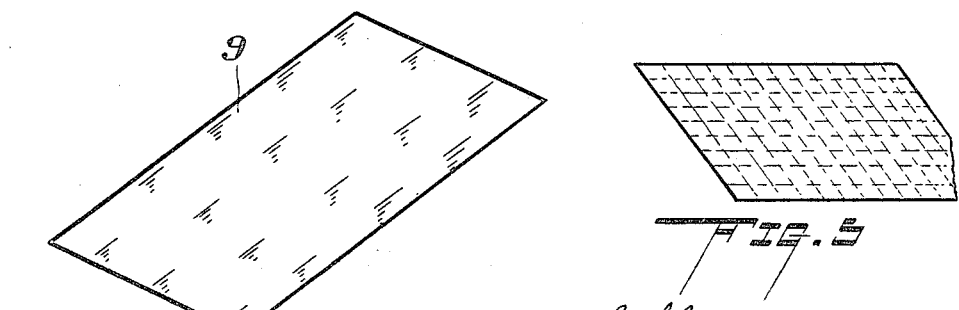
Fig. 4
Fig. 5
Otto G. Shaw
George A. McKenzie
INVENTORS
BY
Geo. B. Willcox ATTORNEY

UNITED STATES PATENT OFFICE.

OTTO G. SHAW AND GEORGE A. McKENZIE, OF BAY CITY, MICHIGAN.

MOLD.

1,211,632. Specification of Letters Patent. Patented Jan. 9, 1917.

Application filed January 11, 1916. Serial No. 71,487.

*To all whom it may concern:*

Be it known that we, OTTO G. SHAW and GEORGE A. MCKENZIE, citizens of the United States, both residing at Bay City, in the county of Bay and State of Michigan, have invented certain new and useful Improvements in Molds; and we do hereby declare the following to be a full, clear, and exact description of the invention, such as will enable others skilled in the art to which it appertains to make and use the same.

Our invention relates to the manufacture of concrete blocks and the like formed with a facing of material such as granite or any other suitable substance to give the block an unusual or artistic appearance, and the invention pertains more particularly to the manner in which such blocks are formed, the objects of the invention being to provide a removable facing screen or sheet to be used in the mold for the purpose of supporting the facing material of the block after the block is formed, in order that the block may be removed from the mold very soon after being formed, leaving the mold available for the manufacture of fresh blocks and thereby greatly increasing the daily output of the mold.

A further object of our improvement is to provide a facing sheet so constructed that water can be made to pass through the sheet to soften the adhesive which is commonly used to hold the facing material in place while the block is being molded.

As has been stated above, our improvement is especially adapted for use in the manufacture of so-called faced blocks, that is, blocks having a body of concrete with a facing of granite chips or other material, and our improvement is further especially adapted for the making of this type of block where the block has a face of uneven contour commonly known as rock-face, that is, with depressions and projections unevenly distributed over its surface.

The method by which such blocks are ordinarily made consists in coating the pallet of the mold with some kind of adhesive, covering the gummed surface with the granite chips or other facing material and molding the concrete block on the layer of material so formed. After the block has partly set the pallet is removed, the face having been soaked in water to soften the adhesive.

By the use of our present improvement we are able to remove the block from the mold as soon as it is formed, leaving the mold ready to receive the material for another block.

By the peculiar construction of the sheet that carries the adhesive material we are able to handle the new block without danger of injuring its face and to remove the sheet from the block by softening the adhesive in much less time than is required for the removal of the pallet from the block as above described. The sheet, if made according to the preferred construction which we will presently describe, can be used over again in the making of additional blocks.

With the above and certain other objects in view, which will appear later in the specification, our invention comprises the devices described and claimed and the equivalents thereof.

In the drawings, Figure 1 is a cross sectional view of a mold, showing the facing sheet in position. Fig. 2 is a perspective view, showing a preferred form of the facing sheet. Fig. 3 is a perspective of a modified form of facing sheet. Fig. 4 is a further modified form of facing sheet. Fig. 5 is a still further modified form of screen comprising cloth or fabric with thin wires interwoven, to enable the fabric to retain the shape into which it is pressed.

Our improvement, as noted above, consists in the novel construction and mode of operation of a facing sheet that is adapted, not only to take the form of the rock-face pallet or bottom of the mold when the concrete that is to comprise the body of the block is put into the mold, but the sheet is also adapted to retain that form after the block is removed from the mold and to assist in supporting the face of the new block. The sheet is further adapted, by reason of its porous nature, to permit water to soak through when it is sprayed, as by a hose, or when it is otherwise moistened. The soaking of the water through the sheet quickly softens the adhesive and permits the sheet to be removed from the block in much less time than would be possible if a sheet were used which would not permit water to pass through it.

In the drawings 1 represents the sides of the mold, 2 the face-plate or pallet, 3 the flexible porous sheet which comprises the principal feature of our invention, 4 the layer of facing material, such as granite chips, fastened by adhesive to the face of the porous sheet 3.

5 represents the body of the concrete block, forming a backing for the layer of facing material.

It will be noted that the flexible porous sheet 3 is interposed between the pallet or face-plate 2, which may be of irregular surface, and the adhesive.

In using our invention, we first take a sheet of flexible porous material, coat one face with adhesive and upon the adhesive deposit a layer of the granite chips or other facing material. The flexible sheet with its layer of facing material is then placed in the mold, resting upon the upward projections of the uneven or rock-face pallet and partly conforming to the shape of the pallet. The concrete forming the body of the block is then put into the mold and forced into place by tamping, if the block is made of so-called dry concrete, or by pouring and gently spudding if the mixture is of wet concrete. In either case the mass of concrete presses the flexible sheet and its layer of facing material into conformity with the irregular surface of the face plate 2, so that the layer of facing material accurately assumes the shape of the face plate. After the block is formed, the block, together with the sheet of facing material can be immediately removed from the mold, provided the block has been made by the dry tamp process, or it may be removed from the mold as soon as it has begun to take its initial set if it has been made of wet concrete. The face-plate or pallet is not carried away with the block and consequently is immediately available for the making of other blocks. The formed block with its attached porous facing sheet is set one side and the facing sheet may be removed very soon thereafter by wetting the sheet with water.

As has been stated, the sheet is porous, so that water will pass through and soften the adhesive by which the sheet is attached to the facing material of the block. If the sheet were impervious to moisture a much longer time would be required to soak the sheet from the block and consequently the cost of manufacturing blocks would be much greater than the cost of making them by the use of our improved porous sheets. The porous sheets may be made of any suitable or convenient material that is sufficiently flexible and pliable to be capable of being pressed into conformity with the irregular surface of the mold, but we have found in practice that excellent results can be obtained with sheets of the construction shown in Fig. 2, where 6 is a wire mesh screen, preferably formed with relatively large openings, say, one-fourth to three-eighths inch mesh, to enable the screen to readily conform to the shape of the face plate, and 7 is a layer of cloth, fabric, or any other suitable material that will permit water to soak through. The cloth may be secured to the wire mesh 6 by stitching, or in any other suitable manner, or it may be merely laid on the surface of the screen.

Another form of porous sheet is shown in Fig. 3, where 8 is a fine mesh screen or wire cloth, preferably of fine copper wire. This screen permits water to soak through and if the adhesive which is applied to its surface to hold the granite chips or other facing material is of such pasty nature that it will cover the surface of the screen without filling the meshes, then it may not be necessary to employ cloth as a covering for the screen.

A still further modified form of porous sheet is indicated in Fig. 4, where 9 is a sheet of paper, pasteboard, or other suitable material, which is sufficiently porous to allow water to soak through and soften the adhesive.

It has been found in practice that if the paper is thin it will readily conform to the shape of the rock-face mold without tearing sufficiently to interfere with the making of a proper block, and if the paper is relatively thick it may be first moistened before being put into the mold and will then readily conform to the uneven surface of the rock-face pallet or face-plate of the mold when the concrete backing is forced into the mold.

It is obvious that the screens of Figs. 2 and 3 and 5 can be used over and over again, whereas the paper screen is so inexpensive that a new screen can be used for each block.

A still further advantage of the removable porous pliable sheets is that when used in the making of blocks by the dry tamp process the moisture which is applied to the outer surface of the porous sheet for the purpose of softening the adhesive also performs the important function of allowing sufficient water to pass through to cover the entire exposed surface of the block. The moisture then penetrates the block so that the setting of the cement is materially assisted and a stronger and more durable face is obtained.

By the means above described, we have provided a removable sheet that serves as a facing for concrete blocks in the process of manufacture, which by reason of its flexibility and pliability will readily adapt itself to the shape of a regular-faced pallet when the concrete backing is placed in the mold and which, by reason of its porosity, can be easily and quickly removed from the block by the application of water, thereby saving labor in the manufacture of blocks and considerably reducing their cost.

While we have described our improved facing sheet as applied to the making of blocks where the facing material is first put into the mold and then followed by the concrete to form the body of the block, yet it will be understood that the porous sheets may equally well be used in connection with other systems of block-making where the material for the body of the block is first put into the mold and then followed by the facing material mounted on the flexible sheet, which is pressed into place by a suitable pallet that may be of uneven surface. In this case also the material of the body of the block causes the flexible sheet and its layer of facing material to conform to the shape of the face of the pallet.

Having thus described our invention, what we claim and desire to secure by Letters Patent is:

In combination with a mold for making concrete blocks composed of a mass of body material and a layer of facing material, said mold having a face plate of irregular surface; a removable facing sheet of flexible material, said sheet carrying said layer of facing material secured to the sheet by adhesive, the said sheet being porous, and adapted to be shaped to the irregular surface of the face plate by the pressure of the body material.

In testimony whereof we affix our signatures in presence of two witnesses.

OTTO G. SHAW.
GEORGE A. McKENZIE.

Witnesses:
NELLIE M. ANGUS,
ROY WALLIS.